United States Patent [19]

Lawes et al.

[11] 4,320,923

[45] Mar. 23, 1982

[54] METHOD FOR SOLUTION MINING OF URANIUM ORES

[75] Inventors: Bernard C. Lawes; John C. Watts, both of Wilmington, Del.

[73] Assignee: E. I. Du Pont de Nemours and Company, Wilmington, Del.

[21] Appl. No.: 15,209

[22] Filed: Feb. 26, 1979

Related U.S. Application Data

[63] Continuation-in-part of Ser. No. 739,967, Nov. 8, 1976, abandoned.

[51] Int. Cl.³ .................... E21B 43/28; C01G 43/00
[52] U.S. Cl. .......................................... 299/5; 423/17
[58] Field of Search ............. 252/186; 423/17; 299/4, 299/5

[56] References Cited

U.S. PATENT DOCUMENTS

| | | | |
|---|---|---|---|
| 3,687,627 | 8/1972 | Stalter | 252/186 |
| 3,746,646 | 7/1973 | Boixader | 252/186 |
| 3,792,903 | 2/1974 | Rhoades | 423/17 |
| 3,865,435 | 2/1975 | Sarcen | 299/5 |
| 3,951,594 | 4/1976 | Smolens | 252/186 |
| 3,996,151 | 12/1976 | Kirner | 252/186 |
| 4,103,963 | 8/1978 | Espenscheid et al. | 299/4 |
| 4,155,982 | 5/1979 | Hunkin et al. | 423/17 |

*Primary Examiner*—Edward A. Miller

[57] ABSTRACT

In the solution mining of uranium ores using an aqueous ammonium carbonate leaching solution containing hydrogen peroxide and/or molecular oxygen as oxidant, permeability of the ore formation during the leaching operation is maintained or improved by including a small amount of alkali metal silicate dissolved in the leaching solution. The silicate also improves the stability of the oxidant in many instances.

5 Claims, No Drawings

METHOD FOR SOLUTION MINING OF URANIUM ORES

CROSS-REFERENCE TO RELATED APPLICATION

This application is a continuation-in-part application of copending application Ser. No. 739,967, filed Nov. 8, 1976, now abandoned.

DESCRIPTION

TECHNICAL FIELD

The present invention relates to processes for the solution mining of uranium ores and more particularly to such processes which maintain the permeability of the uranium ore formations.

BACKGROUND ART

With the increasing use of nuclear power plants for the production of electricity in the United States, uranium ore deposits have become an increasingly valuable natural resource. Even though there are extensive uranium deposits distributed throughout the Western United States, many of these are located at too great a depth from the surface and/or are of too low concentration to be mined economically by conventional open pit or shaft mining techniques. Especially for such ore sources where conventional mining techniques are uneconomical or where they present severe ecological or esthetic problems, solution mining has been proposed in many instances.

In a typical solution mining situation, a central production well can be drilled into a permeable uranium ore formation and a plurality of regularly spaced injection wells drilled around the production well. To start production, a leaching solution is pumped into the ore formation through the injection wells. The solution moves through the formation dissolving the uranium compounds in the ore as it passes toward the center of the ore formation from which it is removed by means of the production well. The leaching solution containing the dissolved uranium is then pumped to an extraction treatment zone where the leaching solution is treated to separate the uranium compounds.

Several solution mining (in-situ leaching) processes have been suggested. For example, the solvent most frequently used for leaching has been an acid or carbonate solution. The uranium is then removed from the leaching solution by ways such as (1) adjusting the pH of the solution to neutral or basic pH to precipitate out the uranium, (2) separating the uranium compounds by ion exchange or (3) concentrating the uranium by liquid-liquid extraction.

Many in-situ leaching operations employ an alkaline carbonate leaching solution containing an oxidizing agent. The carbonate can be present as an ammonium or sodium salt or mixtures thereof. Ammonium ions are preferred in many instances because they are less likely to interfere with permeability of the ore formation.

Because uranium in the 4+ valence state is insoluble in water, an oxidant is needed to oxidize it to the 6+ valence state, which is soluble in the form of a carbonate complex. The basic chemistry of this method of extraction is shown by the following equations:

$$UO_2 + \tfrac{1}{2}O_2 \rightarrow UO_3 \qquad (1)$$

$$UO_3 + H_2O + 3CO_3^{--} \rightarrow UO_2(CO_3)_3^{4-} + 2OH^- \qquad (2)$$

The hydroxyl ions produced in reaction (2) tend to cause formation of insoluble uranium compounds, especially when sodium ions are also present. The $-OH$ ions can, however, be readily removed by reaction with bicarbonate ions which favorably affect the equilibrium of the solubilizing reaction as well as prevent precipitation of insoluble uranium compounds such as sodium uranate. Thus, it is usually preferred to use carbonate leaching solutions containing enough bicarbonate to react with hydroxyl ions formed in the manner of reaction (2).

Though many oxidizing agents have been suggested and tried for this use, hydrogen peroxide and molecular oxygen ($O_2$) are especially desirable for this use because they and their decomposition products—$O_{22}$ and $H_2O$—are completely non-polluting and thus ecologically acceptable. Hydrogen peroxide is preferred, however, because it can be introduced as a liquid that contains oxidant in highly concentrated form, whereas the concentration of injected oxygen gas is highly limited by its solubility. As a consequence, the liquid oxidant is less likely than a gas to cause vapor locking within the ore body. Even when the hydrogen peroxide does decompose in contact with the ore, the $O_2$ produced is likely to be well distributed over a wider portion of the ore body in the form of quite small sized bubbles which further contribute to an even more thorough distribution of oxygen solubilized in leach solution. Thus, there is greater potential for increasing the reaction rates for solubilizing the insoluble uranium compounds in the ore.

The chemistry of uranium leaching is less well characterized for hydrogen peroxide than for oxygen. Conceivably, by analogy with equation (1) above, the reaction may be:

$$UO_2 + H_2O_2 \rightarrow UO_2^{++} + 2OH^-$$

However, uranium in the 6+ valence state is known to form peroxy addition compounds such as $UO_6^{--}$, and it is entirely likely that one or more peroxy compounds are involved in the overall chemistry. Suffice it to say, however, that $H_2O_2$ is a potential oxidant either as $H_2O_2$ or as a latent source of $O_2$.

The use of either molecular oxygen or hydrogen peroxide in alkaline carbonate leaches may contribute to the tendency of the formation to become less permeable as the leaching process proceeds. Diminished permeability greatly increases the time required to leach out an ore body. Thus, the use of hydrogen peroxide and/or molecular oxygen as the oxidant, along with other factors such as the particular cations in the leaching solution, the type of clay, the electrostatic charges on the clay particles and pressure drop between the injection and production wells, in some instances appear to cause loss of permeability.

The problem of maintaining permeability of an ore body during leaching is not a new one. For example, in U.S. Pat. No. 3,309,140, Gardner et al propose the addition of polyacrylamide to an acidic leaching solution containing sodium chlorate as an oxidant. U.S. Pat. No. 3,567,427 mentions that hydrogen peroxide can be effective for the disaggregation of certain clay minerals, which suggests that hydrogen peroxide might be troublesome in applications such as solution mining where disaggregation is to be avoided. These references obviously do not, however, address themselves to the problem of maintaining permeability in the presence of hydrogen peroxide. De Vries in U.S. Pat. No. 3,908,388 discloses the use of the reaction product of a non-aqueous slurry of alkali metal silicate with an alkyl amide to insolubilize the alkali metal silicate for the purpose of stabilizing sand and thus to maintain oil permeability. Also, Peeler in U.S. Pat. No. 2,968,572 employs similar amides to insolubilize aqueous alkali metal silicates for soil stabilization in the presence of ground moisture. However, the problem contemplated there was oil permeability, not water permeability. Furthermore, no oxidant was present in the system and higher silicate concentrations were used.

Several other U.S. patents disclose the use of many other agents for gelling or setting alkali metal silicates to make them useful for soil stabilization, e.g., the following:

U.S. Pat. No. 583,166     Portland cement
U.S. Pat. No. 3,288,040     Alkali metal hexafluorosilicate
U.S. Pat. No. 3,558,506     Methyl $C_{1-3}$ acylates.

The use of alkali metal silicates for the purpose of soil stabilization has heretofore apparently been limited to systems in which the alkali metal silicate was admixed with an extraneous agent for the purpose of gelling or solidifying the dissolved silicate.

DISCLOSURE OF THE INVENTION

According to the present invention there is provided in a process for the solution mining of a uranium ore formation where an aqueous carbonate leaching solution containing an oxidant is passed through the ore formation to dissolve uranium from the formation therein and the solution is withdrawn from the ore formation enriched in uranium, the improvement comprising: passing through the ore formation an aqueous ammonium carbonate leaching solution having a pH of 7–10, and which has dissolved therein an oxidant selected from the group consisting of hydrogen peroxide, molecular oxygen and a mixture thereof and an alkali metal silicate.

The process of the invention is applicable generally to the use of ammonium carbonate leaching solutions which contain either hydrogen peroxide or molecular oxygen as an oxidant. When hydrogen peroxide is used, the process is likely to involve both species of oxidant since the hydrogen peroxide undergoes decomposition in contact with the ore. Such decomposition is probably catalytic in nature, can be quite extensive and may be virtually complete in some instances.

As used herein, the term "ammonium carbonate leaching solutions" means aqueous solutions of $NH_3$ and $CO_2$. Such solution will ordinarily have an initial pH, i.e., prior to injection into the ore formations, of 7–10. Although the concentration of $NH_2$ and $CO_2$ may vary widely within those pH limits, the leaching solution will ordinarily be comprised of from 0.5 to 20 grams per liter of ammonium carbonates, basis either $--CO_3$ or $--HCO_3$. From 1 to 10 grams per liter are preferred. Such solutions are prepared most easily by sparging $NH_3$ and $CO_2$ into water until the desired concentrations of chemical reactants are reached and then adjusting the pH by the addition of more $NH_3$ to raise the pH or $CO_2$ to lower pH. They can, however, also be made by dissolving the solid carbonates in the water and then adjusting pH in the same manner only altering the proportions of the solid carbonates. Typically, an ammonium carbonate leaching solution will contain from about 10 to 15 grams of carbonate compounds per liter of solution, e.g., 10 grams of ammonium bicarbonate and 0–5 grams of ammonium carbonate.

The concentration of hydrogen peroxide in the leaching solution is only one factor that impinges on successful solution mining of uranium bearing ores. Other economic or technical parameters associated with the particular formation being treated, such as pH, particle size and temperature, may be more important and may even be overriding considerations. Ordinarily, however, the aqueous leaching solution will contain 0.1–10 grams $H_2O_2$ per liter and preferably 0.2–2 grams $H_2O_2$ per liter.

Hydrogen peroxide suitable for use in leaching solutions used in the invention is available commercially in aqueous solutions containing from 10 to 90% by weight $H_2O_2$, any of which can be used in the invention. As used in accordance with the invention, hydrogen peroxide has very little effect on pH of the leaching solution and therefore need not ordinarily be a factor in adjusting pH of the leaching solution. These $H_2O_2$ solutions may in some instances contain one or more stabilizers to inhibit decomposition such as those which are disclosed in U.S. Pat. Nos. 2,872,293; 3,122,417; 3,387,939; 3,649,194; 3,691,022; 3,687,627 and 3,869,401. However, the use of such stabilizers is not essential to the practice of the invention.

It has been found that only a very small concentration of alkali metal silicate per liter of total leaching solution is needed to reduce loss of permeability within the formation significantly. The minimum effective concentration of silicate is highly subjective to the formation being treated and its particular physical and chemical characteristics. However, ordinarily at least about 0.1 and preferably at least about 0.2 gram of alkali metal silicate will be used per liter of total leaching solution. However, more significant effects are produced if at least about 0.5 gram per liter is used. An optimum concentration of alkali metal silicate appears to be 0.5–1.5 grams per liter. Even through higher concentrations of alkali metal silicate (e.g., up to 5 g/l) may be used, no further advantage with respect to permeability was apparent from such use. Furthermore, the use of higher concentrations in some instances will significantly increase the incidence of gelling the silicate which will cause a loss in permeability of the ore formation. However, it has been found that leaching solutions containing as high as 10 grams of $NH_3$-$CO_2$ per liter and even higher and the preferred 0.5–1.5 grams of silicate per liter resist gellation for quite long periods of time.

Suitable alkali metal silicates include silicates of sodium, potassium and lithium, of which sodium is preferred. The silicates must, however, be stable aqueous solutions which contain no appreciable amount of particulate silica. Transparent solutions which exhibit little, if any, Tyndall effect, are uniformly suitable with respect to stability against loss of permeability induced by gellation. Suitable aqueous sodium silicate solutions are available having $SiO_2$:$Na_2O$ weight ratios of from 1.90 to 3.25 and containing from 27.0 to 36.0% wt $SiO_2$ and from 8.7 to 19.4% wt $Na_2O$. Sodium silicate solutions of this type are alkaline and have a pH range of between 10 and 13.

In preparing leaching solutions for use in the process of the invention, no particular order of mixing is needed.

The invention is exemplified and can readily be understood by reference to the examples which are set out hereinbelow.

DEFINITIONS AND ABBREVIATIONS

ABC = ammonium bicarbonate = $NH_4HCO_3$
AC = ammonium carbonate = $(NH_4)_2CO_3$
$NH_3$-$CO_2$ or "carbonate" refers broadly to aqueous leach solutions of $NH_3$ and $CO_2$ containing ammonium carbonate, ammonium bicarbonate or mixtures thereof.

"Goal flow" or "goal flow rate" refer to a predetermined flow rate to be maintained during a run (within the capabilities of the pump being used) to pump leachate from the bottom of a leach column.

"Companion Run" refers to side-by-side comparative column leaching runs.

"Leach" refers to the solution fed from the inlet reservoir to the top of the leach column.

"Leachate" refers to the solution pumped from the bottom of a leach column after passing through the ore bed.

The terms "silicate", "sodium silicate", "sil.", and "$NaSiO_3$" may be used interchangeably. All weights or concentrations are on the basis of Du Pont Sodium silicate, Grade F or Grade No. 9 diluted to the same solids as Grade F. Both Grades have an $SiO:Na_2O$ weight ratio of 3.25.

EXPERIMENTAL APPARATUS AND PROCEDURE

1. Apparatus

Two parallel leaching systems were set up, each having (1) an inlet reservoir for fresh leaching solution, (2) a leach solution feed pump on the outlet of the inlet reservoir communicating with (3) a leaching column containing a fixed bed of finely divided uranium ore having a depth in most cases of about 2.5–10 cm, (4) a peristaltic leachate pump on the outlet of the leach column discharging into (5) a leachate reservoir. The vapor space in the tops of the leach columns, the leachate reservoir and inlet reservoir were each manifolded to a gas collection burette so that any $O_2$ gas release in the system could be measured.

2. Procedure (1) Pack leach columns with ore charge resting atop a glass wool plug on a coarse fritted glass disk. Tamping was generally not required to prevent voids;

(2) Charge inlet reservoirs with one liter of leaching solution with ingredients being added in the following order: $NH_4HCO_3$ and/or $(NH_4)_2CO_3$, sodium silicate solution and $H_2O_2$ solution;

(3) Pump leaching solution into leach columns to permeate to bottom of ore bed and continue pumping rate;

(4) Activate leachate pump and establish as nearly as possible a predetermined leach flow through both systems. Pump speeds were recorded.

3. Ore Characteristics

A. A high-uranium ore containing 0.85% wt U and about 21% wt $CaCO_3$ from a South Texas site. Material was dry (1–1.4% wt $H_2O$ based on drying loss at 110° C.) and free flowing.

B. A weakly mineralized ore of sandy consistency containing only about 0.03% wt U rich in pyrite also from South Texas. Material was sufficiently wet (12–14% wt $H_2O$) that it did not flow freely but was easily spooned into the leach column.

C. A very weakly mineralized ore containing less than 5 ppm by weight U. Material was dry and free flowing.

4. Methods of Determining $H_2O_2$ Loss During Leaching

A. By Gas Collection

As described above, manifolded flexible tubing conveyed all $O_2$ gas released by $H_2O_2$ decomposition from the leach column, the inlet reservoir and the leachate collection reservoir into an inverted gas collection cylinder. The percent of $H_2O_2$ decomposed (% converted to $O_2$) after a time (t) in which a certain volume (liters) of leachate, containing a certain concentration of $H_2O_2$ was collected, was computed as follows:

$$\frac{cc\ O_2\ collected\ converted\ to\ STP}{liters\ of\ leachate\ \times\ g\ H_2O_2/l\ leach\ \times\ \frac{1}{34\ \times\ 2}}$$

The collected gas volume was converted to STP by multiplying the observed volume by 0.9. This conversion factor was based on the finding that when 1.8 g of $H_2O_2$ was contacted with three different ores and the released gas collected by displacement of water, the following relation was obtained:

$$\frac{Stoichiometric\ O_2\ from\ equation\ 2H_2O_2 \longrightarrow 2H_2O\ +\ O_2}{Observed\ O_2\ released} = 0.90 \pm 0.03$$

B. By Titration

Assuming that the $H_2O_2$ in the inlet reservoir is stable, the $H_2O_2$ lost solely to leaching can be measured by titrating a grab sample from the column. This was generally done by collecting at the end of a run (without interrupting flow) a 100 cc sample of leachate at the same flow rate (mostly 5 cc/min) as used during the run. Then 20 cc aliquots of the 100 cc sample and of the leach in the inlet reservoir were titrated by standard iodimetry:

% $H_2O_2$ lost =

$$\left[ \frac{Inlet\ Reservoir\ Titre - Grab\ Sample\ Titre}{Inlet\ Reservoir\ Titre} \right] = 100$$

Unless otherwise stated, analysis of "$H_2O_2$ lost by titration" is by titration of a grab-sample rather than of the collected leachate.

EXAMPLE I

This example illustrates both the effect of a leaching solution containing $H_2O_2$ in reducing permeability of an ore body and the reversal of that effect by adding aqueous sodium silicate to the leaching solution.

Using Ore A, a control leach solution containing 10 g ABC/l, 2.5 g AC/l and 1.2 g $H_2O_2$/l (pH 8.7) was pumped through a 50 g ore bed contained in a 42 mm ID column, at 10 cc/min. After 20–30 minutes, the column began to plug, and by 50–60 minutes it was only possible to pump from the bottom of the ore bed about 5 cc/min, even though the outfall pump rate was substantially increased. Stirring the wet bed with a spatula did not improve permeability.

In a companion set of two runs, it was found that silicate essentially prevented this loss of permeability. With 3 g/l of silicate (Du Pont Grade F) in the abovedescribed leach solution, a flow rate of 10 cc/min was easily maintained over a 65-minute period, to collect 650 cc of leachate. Using no silicate in the companion run, it took 98 minutes to collect 620 cc of leach, even though the outlet pump was at a much higher speed.

EXAMPLE II

In a series of tests, permeability of the ore bed was examined as a function of $H_2O_2$ in the leaching solution, pH and silicate in the leaching solution. One hundred grams of Ore C were extracted in companion 42 mm leaching columns using a basic leach solution containing 10 g ABC/l +2.5 g AC/l adjusted to pH 8.6 with $NH_3$ or to pH 10.2 with NaOH. Goal flow rate was 5 cc/min. The results are given in Table 1.

TABLE 1

| Cumulative Running Times, Min. | Basic Leach Modifications | | Leach Flow Rate, cc/min | |
|---|---|---|---|---|
| | Column A[(1)] | Column B[(2)] | Column A | Column B |
| 0–60 | as is (no $H_2O_2$) | as is (no $H_2O_2$) | 5 cc/min at 25 rpm pump speed | Similar |
| 60–68 | as is (no $H_2O_2$) | as is (no $H_2O_2$) | 12.8 cc/min at 58 rpm | Similar |
| 68–108 | 1.8g $H_2O_2$/l | 1.8g $H_2O_2$/l | Slowed to 4–5 cc/min at >110 rpm | Similar |
| 108–144 | 1.8g $H_2O_2$/l | also added 3g $NaSiO_3$/l (Example III) | 3.6 cc/min at 50 rpm | 6.1 cc/min at 50 rpm |

[(1)]Leaching solution pH 8.6
[(2)]Leaching solution pH 10.2

At both pH 10.2 and 8.6 the addition of $H_2O_2$ during the runs caused a very noticeable loss in the rate at which leach solution could be pulled through the columns. A further indication of permeability loss was shown by the reading of a vacuum gauge at the outlet of the column being leached at pH 8.6, which showed only 0.6 in. during the period when no $H_2O_2$ was in the leach. However, the vacuum gradually increased to 20–21 in. of mercury during the 40-minute leach period after $H_2O_2$ was added.

Note in the last 36-minute time period that the addition of silicate to the pH 10.2 leach solution caused a marked improvement in leach flow as compared to the pH 8.6 leach containing no silicate.

In another similar run (using one column), the vacuum at the outlet of the column rose to 16.8 in. over a 40-minute period. As the $NH_3$-$CO_2$ leach containing 1.8 g $H_2O_2$/l was pumped from the bottom of the column at an average rate of 4.0 cc/min, the pump speed had to be increased from 23 to 130 rpm (85 rpm after 7 minutes). Then 3 g $NaSiO_3$/l was added to the leach and pumping was resumed for 60 minutes to pump 298 cc of leach (5.0 cc/min). During this time the vacuum decreased from 18.5 to about 13.5 in. as the pump speed also gradually decreased to about 70 rpm. The leach flow was interrupted for ten minutes, and during an ensuing 15-minute flow period, an average 6.3 cc/min flow rate was obtained as the pump speed fell to 42 rpm and the vacuum fell to about 7 in.

EXAMPLE III

In this test series, the adverse effect of $H_2O_2$ on permeability and its prevention by use of sodium silicate addition were demonstrated on Ore B using a basic leach containing 4 g ABC/l+4 g AC/l. The results are given in Table 2.

TABLE 2

| Run No. | Length of Run Min. | Basic Leach Modifications | | Leach Flow Rate cc/min | | Pump Speed rpm | |
|---|---|---|---|---|---|---|---|
| | | Column A | Column B | Column A | Column B | Column A | Column B |
| 1 (Control) | Run, 60 min | None (no $H_2O_2$) | — | 2.83 | — | 58 | — |
| 2 (Control) | Run, 90 min Stand overnight. | None (no $H_2O_2$) | — | 2.89 | — | 58 → 64 | — |
| 3 (Control) | Run, 60 min Recharge columns with fresh ore. | Add 1.80g $H_2O_2$/l | — | 1.67 | — | 64 → 119 | |
| 4A (Control) | Run, 110 min | with 1.80g $H_2O_2$/l & no sil | — | 1.27 | — | 115 after 20 min | — |
| 4B (Example III) | Run, 110 min Stand for 49 min; no flow. | — | with 1.80g $H_2O_2$/l plus 1g sil/l | — | 2.76 | — | 58 → 110 over 110 min |
| 5A (Control) | Run, 40 min | with 1.80g $H_2O_2$/l & no sil | — | 0.87 | — | 115 | — |
| 5B (Example III) | Run, 40 min | — | With 1.80g $H_2O_2$/l plus 1g sil/l | — | 2.77 | — | 100 |

Summary of Results:

With no $H_2O_2$ in either formulation, the pump setting needed to pull 5 cc/min from the bottom of the columns was close to the 20–25 rpm used to maintain an inlet feed of 5 cc/min to the columns, indicating only a small resistance to flow. With a modest increase in pump speed, the rate quickly rose to 12.8 cc/min.

EXAMPLE IV

In a series of tests, the effect of the following variables upon permeability was studied: (1) adding $H_2O_2$ with and without silicate; (2) discontinuing silicate addition; and (3) effect of adding silicate after permeability has been diminished. Two comparison runs were run at a goal flow rate of 10 cc/min on Ore A using a basic leach containing 10 g ABC/l+2.5 AC/l.

In two comparison runs, Columns A and B were first flushed with 500 cc of peroxide-free basic leach for 50 min. A flow of 10 cc/min was easily maintained well below a pump speed of 100 rpm. When 1.20 g $H_2O_2/l$ was added to the leach solution to Column A, and pumping from the column was resumed for 30 minutes, the outlet pump speed had to be increased to 345 rpm during this period to be able to maintain an overall flow rate of close to 10 cc/min. However, this same flow rate could be obtained in the companion column (B), in which the peroxide-containing leach also contained 3 g/l of sodium silicate, at a pump speed of only 92 rpm. When the silicate was removed from the leach being fed to Column B, facile flow (at 10 cc/min) was maintainable for an additional 2 hours, at the end of which the run was terminated. These runs show not only that silicate is beneficial in preventing loss of permeability, but also that the beneficial effect is sustained for a substantial period of time after silicate is removed from the leaching solution.

In a similar companion set of runs, partial plugging was induced by pumping through 320 cc of a silicate-free basic leach solution containing 1.20 g $H_2O_2/l$ for 56 minutes, as a result of which flow diminished to below 5 cc/min even though pump speed was increased to 350 rpm. When 3 g/l of sodium silicate was added to the leach, flow rate did not improve as the next 210 cc of leach was pumped through the ore. However, when pumping was interrupted for 72 minutes, it became possible to pump 1000 cc of leach through the ore bed over an 80 minute period at about 12.5 cc/min at a pump speed of only about 85 rpm. In the companion control run, where silicate was not added, the 72-minute standing period caused only a temporary relief from plugging. Over the subsequent 80-minute period, flow was less than half the 12.5 cc/min rate of the silicate run even though pump speed was up to about 425 rpm.

The second experiment indicates that permeability, even after being partially lost during leaching with a peroxide-containing ammonium carbonate solution, can be restored if silicate is added to the leach subsequent to the loss. Furthermore, this experiment suggests that such restoration of permeability is best effected by interrupting the flow of leach for a period of time after the ore has been permeated with a relatively small quantity of silicate-containing leach.

EXAMPLE V

In a series of tests, the following effects were examined:

(1) Loss of permeability with peroxide leach
(2) Use of silicate to prevent loss of permeability, and
(3) Use of silicate to restore permeability once lost.

Table 3 is a running log of comapanion leach experiments using the basic leach 4 g ABC/l+4 g AC/l (equivalent, by calculation to 2.28 g $NH_3/l$ and 4.06 g $CO_2/l$) +1.80 g $H_2O_2/l$, and 100 gram charges (in the 42 mm I.D. columns) of ore A. Information on permeability is given by the "Leachate Flow Rate" column in Table 3 in conjunction with data on pump rpm's below in the text. Information on $H_2O_2$ lost during leaching is based on $O_2$ loss (last column in table).

TABLE 3

COLUMN LEACHING OF ORE A
EFFECT OF SILICATE AND STABILIZER ON STABILITY AND PERMEABILITY
BASIC LEACH: 4 g ABC/l + 4 g AC/l + 1.80 g $H_2O_2/l$

| RUN NO. | LENGTH OF RUN MIN | pH A | pH B | ADDITIVES A | ADDITIVES B | VOL LEACHATE cc A | VOL LEACHATE cc B | LEACHATE FLOW RATE cc/min A | LEACHATE FLOW RATE cc/min B |
|---|---|---|---|---|---|---|---|---|---|
| 6A & B (Control) | 90 | 8.6 | 8.6 | None | None | 455 | 450 | 5.1 | 5.0 |
| 7A & B (Control) | 60 | 8.6 | 8.6 | None | None | 135 | 100 | 2.2 | 1.7 |
| 8A & B (Control) | 37 | 8.6 | 8.6 | None | None | 25 | 22 | 0.67 | 0.59 |
| 9A (Control) | Stand overnight, no flow | | | | | | | | |
| 9B (Example) | 50 | 8.6 | 8.77[1] | None | 4 g/l Sil[2] | 52 | 160 | 1.0 | 3.2 |
| 10A (Control) | Stand overnight for 62 min, no flow. | | | | | | | | |
| 10B (Example) | 35 | 8.6 | 8.77 | None | 4 g/l Sil | 35 | 208 | 1.2 | 5.9 |
| | Let stand 156 min., then add silicate to A and run A alone for next 74 min. | | | | | | | | |
| 11A (Example) | 74 | 8.77 | — | 4 g/l Sil | — | 111 | — | .75[3] | — |
| | Let stand 272 min., then run B alone for next 30 min. | | | | | | | | |
| 12B (Example) | 30 | — | 8.77 | — | 4 g/l Sil | — | 162 | — | 5.4 |
| | Let stand over weekend, then run A alone for next 41 min. | | | | | | | | |
| 13A (Example) | 41 | 8.77 | — | 4 g/l Sil | — | 336 | — | 8.2 | — |
| 14A & B (Example) | 36.5 | 8.77 | 8.77 | 4 g/l Sil | 4 g/l Sil | 150 | 150 | 4.1 | 4.1 |
| 15A & B (Example) | 100 | 8.77 | 8.77 | 4 g/l Sil | 4 g/l Sil | 415 | 418 | 4.2 | 4.2 |

[1]pH after silicate and $H_2O_2$ added; note small pH raising effect of silicate.
[2]Sodium silicate with $SiO_2 \cdot Na_2O$ = 3.25. Source Du Pont Grade F.
[3]Excluding the first 3 minutes, where flow rate was 19.3 cc/min.

The following can be concluded from these data

Permeability gradually diminished over the 187 minutes (Control Runs 6–8) for the ammonium carbonate/bicarbonate leach containing $H_2O_2$ and no silicate, even though the pump speed had increased to <110 rpm. However, permeability was largely restored when 4 g/l of silicate was added to the leach (Example 9B). In this regard, compare the 35-minute and 50-minute running periods of Runs 10 and 9, but note that a no-flow or rest interval (62 min) was needed after the silicate-bearing leach was added during the 50-minute period. The 5.9 cc/min rate (Example Run 10B) was obtained at a pump speed of 62 rpm; the comparative 1.22 cc/min rate (Control Run 10A) was obtained at 115 rpm.

When silicate was then added to the silicate-free column that had been used in Control Run 9A, there was a marked improvement in permeability. Note, however, (Example Run 11A) that permeability was not improved immediately. Other experiments indicated that 30-60 minutes (and possibly less) was a sufficient interlude between first introducing the silicate-bearing leach and resuming flow.

EXAMPLE VI

The following tests were carried out to determine the effectiveness of low levels of sodium silicate addition to the leaching solution.

In two companion runs using 100 gram charges of Ore C, one ore column was leached with a solution containing 4 g ABC/l+4 g AC/l+1.8 g $H_2O_2$/l, the other with the same solution fortified with 0.2 g/l of sodium silicate. Leachate was pumped from both column outlets using the same pump rpm. The leach containing 0.2 g/l of silicate flowed noticeably better, about 1.3 times faster than the leach containing no silicate for the first 80 minutes, and increasing to 1.44 times faster during the next 120 minutes.

When the leachate containing no silicate was then enriched with 0.5 g/l sodium silicate, the flow improved to the point that it was as good as, or slightly better than, the leach containing 0.2 g/l of sodium silicate.

In another 60-minute comparative run, leach containing 1 g/l of sodium silicate flowed easily at 5 cc/min at pump settings of 45-65 rpm. With no silicate the average flow over this period was only 3.6 cc/min, even though the pump speed was increased from 65 to 118 rpm during the run.

EXAMPLE VII

Because of interest in using sodium as well as ammonium carbonates, tests were conducted in which the ammonium ion was replaced in part or completely by sodium.

Table 4 summarizes companion runs using different leaches containing 1.80 g $H_2O_2$/l and 100 gram charges of Ore C in the 42 mm I.D. column. A goal leach flowrate of 5 cc/min using a pump having 0-120 rpm range was attempted.

The ore had been sieved to $-12+80$ mesh, but the particles were soft (to finger crushing) and clay-like in appearance. When wetted in the column, the larger pieces seemed to lose their particulate identity and the wetted plug seemed to be a fairly uniform, sandy, clay-like aggregate.

TABLE 4

| | SILICATE AND PERMEABILITY IN COLUMN LEACHING: EFFECT OF $Na^+$ VS $NH_4^+$ IN LEACH | | | | | | | | | |
|---|---|---|---|---|---|---|---|---|---|---|
| RUN[1] | | g/l $NaSiO_3$ | | ADDITIONS TO ADJUST pH | | pH | | LENGTH OF RUN, | LEACH FLOW RATES[6] | |
| NO. | BASIC LEACH | A | B | A | B | A | B | MIN | A | B |
| 16 | 4 g $NH_4HCO_3$/l + 4 g $(NH_4)_2CO_3$/l | 0 | 1.0 | None | None | 8.6 | 8.65 | 60 | 3.6 cc/min at 65 → 118 rpm | OK, at 45-65 rpm |
| 17 | 4 g $NH_4HCO_3$/l + 4 g $(NH_4)_2CO_3$/l | 1.0 | 1.0 | $H_2SO_4$ | NaOH | 7.0 | 9.6 | 70 | OK at 38-66 rpm | 3.6 cc/min at 80-110 rpm |
| 18[2] | 4 g $NH_4HCO_3$/l + 4 g $(NH_4)_2CO_3$/l | 1.0 | 1.0 | 5 g/l $Na_2SO_4$ | None | 8.6 | 8.6 | 140 | OK at 22-43 rpm | Flow gradually slowed to 3.5 cc/min at 110 rpm |
| 19[3] | 4 g $NH_4HCO_3$/l + 4 g $(NH_4)_2CO_3$/l | 1.0 | — | None | — | 8.6 | — | 57 | OK at ∼ 32 rpm | — |
| 20 | 4 g $NH_4HCO_3$/l + 4 g $(NH_4)_2CO_3$/l | 1.0 | 1.0 | 0.60 g/l $NH_3$ | 4.3 g/l $NH_3$ | 9.0 | 9.6 | 110 | OK at 35-118 rpm[7] | OK at 35-68 rpm |
| 21 | 4 g $NH_4HCO_3$/l + 4 g $(NH_4)_2CO_3$/l | 1.0 | 1.0 | 1.1 g/l NaOH | 3.0 g/l NaOH | 9.0 | 9.6 | 40 | OK at 25-80 rpm | OK at 25-49 rpm |
| 22[4] | 8 g $(NH_4)_2CO_3$/l | 0 | 2.0 | None | None | 8.78 | 8.80 | A:130 B:60 | Fell off to 2.6 cc/min during last 60 min at 117 rpm | OK at ∼ 25 rpm |
| 23[2],[5] | 8 g $(NH_4)_2CO_3$/l | 0 | 2.0 | None | None | 8.78 | 8.80 | 110 | Fell to 2.2 cc/min at 111 rpm during last 80 min | OK at ∼ 30 rpm |
| 24 | 8 g $(NH_4)_2CO_3$/l | 2.0 | 2.0 | None | None | 8.78 | 8.80 | 140 | OK at ∼ 25 rpm during last 100 min | OK at ∼ 25 rpm |
| 25 | 8 g $(NH_4)_2CO_3$/l | 1.0 | 1.0 | 4.7 g/l NaOH | 13.8 g/l $NH_3$ | 10.0 | 10.0 | 40 | OK at 55 rpm | 1.2 cc/min at 111 rpm |
| 26 | 4 g $NH_4HCO_3$/l + 4 g $(NH_4)_2CO_3$/l | 1.0 | 1.0 | 3.9 g/l $NH_3$ | 3.85 g/l NaOH | 9.6 | 9.6 | 70 | OK at ∼ 25 rpm | 1.3 cc/min at 110 rpm |
| 27 | 4 g $NH_4HCO_3$/l + 4 g $(NH_4)_2CO_3$/l | 1.0 | 1.0 | 3.9 g/l $NH_3$ | 3.85 g/l NaOH | 9.6 | 9.6 | 60 | OK at ∼ 25 rpm | 1.2 cc/min at 110 rpm |
| 28 | 4 g $NH_4HCO_3$/l + 4 g $(NH_4)_2CO_3$/l | 1.0 | 1.0 | 13.8 g/l $NH_3$ | 5.05 g/l NaOH | 10.0 | 10.0 | 90 | OK at ∼ 25 rpm | 1.5 cc/min at 114 rpm |
| 29 | 8 g $(NH_4)_2CO_3$/l | 1.0 | 1.0 | 9.3 g/l $NH_3$ | 4.7 g/l NaOH | 10.0 | 10.0 | 110 | OK at ∼ 25-35 rpm | OK at 25-35 rpm |
| 30 | 10 g $NaHCO_3$/l + | 0 | 2.0 | None | None | 8.78 | 8.95 | 60 | 1.3 cc/min at ∼ 110 rpm and then < 0.1 cc/min | 1.5 cc/min at 95 → 113 rpm |
| 31 | 5 g $NaHCO_3$/l + 0.25 g $Na_2CO_3$/l | 0 | 1.0 | None | None | 8.75 | 9.02 | 130 | OK at 20-45 rpm | 3.0 cc/min at ∼ 111 rpm; then down to |

TABLE 4-continued
SILICATE AND PERMEABILITY IN COLUMN LEACHING: EFFECT OF $Na^+$ VS $NH_4^+$ IN LEACH

| RUN[1] NO. | BASIC LEACH | g/l $NaSiO_3$ A | g/l $NaSiO_3$ B | ADDITIONS TO ADJUST pH A | ADDITIONS TO ADJUST pH B | pH A | pH B | LENGTH OF RUN, MIN | LEACH FLOW RATES[6] A | LEACH FLOW RATES[6] B |
|---|---|---|---|---|---|---|---|---|---|---|
| 32 | 10 g $NH_4HCO_3$/l + 2.5 g $(NH_4)_2CO_3$/l | 3.0 | 3.0 | $NH_3$ | NaOH | 8.6 | 10.2 | 70 | OK at 23–77 rpm; mostly at 54 | 0.3 cc/min 1.4 cc/min at 115 rpm after 15 min |

[1]Brackets denote runs using same ore charge.
[2]After standing 2–3 days after previous runs.
[3]After standing 90 min, after previous run.
[4]Prior to this, leached with 600 cc of $H_2O_2$—free leach at 5 cc/min.
[5]Prior to this, leached with 965 cc of $H_2O_2$—free leach at 5 cc/min.
[6]"OK" means a 5 cc/min flow-rate is maintainable at the pump speed (rpm's) indicated.
[7]Flow improved greatly (only 30–56 rpm needed) for last 40 minutes of this run, which followed a 44-min no-flow interlude.

The data in Table 4 show the following.

(1) Without silicate, permeability decreased during column leaching. Silicate in an $NH_3$-$CO_2$-$H_2O_2$ leach improved permeability (Runs 16, 22 and 23).

(2) Silicate improved permeability throughout the pH range 7–10 normally associated with in-situ uranium leaching. Some effect was seen even when total $NH_3$ was >10 g/l (e.g., Run 28).

(3) In Runs 30 and 31 using a sodium carbonate/bicarbonate leach, silicate did not improve permeability. (Note, however, that inherent permeability using the sodium-based leach was also less than that of ammonium-based leach cited in the table.)

(4) In most runs where a substantial concentration of NaOH (e.g., 3.85–5.05 g/l) was added to the leach to raise a pH to 9.6 or 10.0, the beneficial effect of silicate on permeability was lost (See Runs 17 and 25–28). In fact, these caustic-fortified leaches seemed to cause even poorer permeability than silicate-free leaches containing no caustic. (Compare these last cited runs with Runs 16, 22 and 23.)

In a minority of runs (Runs 21 and 29), however, the caustic fortification did not seem to interfere with permeability. Furthermore, note, in Run 18, that the addition of 5 g/l of $Na_2SO_4$ caused no apparent loss in permeability. The conclusions to be drawn from these observations are that, for purposes of improving permeability in a carbonate leach containing $H_2O_2$, (a) silicate is decidedly beneficial in an $NH_3$-$CO_2$ system in a pH range at least as broad as pH 7–10,
(b) that silicate may be beneficial in a carbonate leach containing both $NH_4^+$ and $Na^+$ as counterions for carbonate and bicarbonate, and,
(c) that carbonate/bicarbonate leaches containing only $Na^+$ counterions appear to cause more permeability loss than silicate-containing $NH_3$-$CO_2$ formulations whether or not they contain silicate.

EXAMPLE VIII

In this series of tests, a comparison was made between the use of $H_2O_2$ as oxidant, both with and without silicate, and $NaClO_3$ as oxidant without silicate.
Test Conditions:
Two companion runs at goal flow 5 cc/min.
Basic Leach: 4 g ABC/l+4 g AC/l; pH 8.6
Column A: 3 g $NaSiO_3$/l+1.8 g $H_2O_2$/l
Column B: 10.8 g $NaClO_3$/l
Ore: 100 g/column, containing about 0.85% uranium

TABLE 5
ORE PERMEABILITY: HYDROGEN PEROXIDE VS SODIUM CHLORATE

| RUN NO. | RUN. TIME MIN. | pH A | pH B | OXIDANT & ADDITIVE A | OXIDANT & ADDITIVE B | VOL. LEACHATE cc A | VOL. LEACHATE cc B | LEACH FLOW RATE, cc A | LEACH FLOW RATE, cc B | PUMP SPEED rpm A | PUMP SPEED rpm B | % LOSS $H_2O_2$ BY $O_2$ LOSS A | % LOSS $H_2O_2$ BY $O_2$ LOSS B | Uranium Extracted Mg[1] A | Uranium Extracted Mg[1] B |
|---|---|---|---|---|---|---|---|---|---|---|---|---|---|---|---|
| 33 | 80 | 8.72 | 8.6 | $H_2O_2$ + 3 g/l Sil | $NaClO_3$ | 400 | 400 | 5.0 | 5.0 | 23–112 | 23–34 | 113 | — | 221 | 187 |
| 34 | 70 | 8.72 | 8.6 | $H_2O_2$ + 3 g/l Sil | $NaClO_3$ | 398 | 398 | 5.0 | 5.0 | ~54 | ~32 | 98 | — | 79 | 41 |
| 35 | 120 | 8.72 | 8.6 | $H_2O_2$ + 3 g/l Sil | $NaClO_3$ | 600 | 600 | 5.0 | 5.0 | ~50 | ~50 | 96 | — | 127 | 69 |
|  | 25 | Flush with 150 cc of basic leach and let stand overnight, no flow. | | | | | | | | | | | | | |
| 36 | 170 | 8.6 | 8.6 | $H_2O_2$ only | $NaClO_3$ | 850 | 850 | 5.0 | 5.0 | 49–85 | 25–30 | 92 | — | 100 | 41 |
|  |  | Let stand 75 min, no flow. | | | | | | | | | | | | | |
| 37 | 140 |  |  | $H_2O_2$ only | $NaClO_3$ | 700 | 700 | 5.0 | 5.0 | 38–101 | 22–24 | 93 | — | 95 | 31 |
| 38 | 50 |  |  |  |  | 192 | 195 | 3.8 | 3.8 | 115 | ~15 | — | — | — | — |
|  | 7.5 | Flush with basic leach (68 cc). Stand over weekend, no flow. | | | | | | | | | | | | | |
| 39 | 60 |  |  | $H_2O_2$ + 0.5 g/l Sil | $H_2O_2$ only | 250 | 238 | 4.17 | 4.0 | 20–73 | 23–>85 | 67 | 67 | — | — |
| 40 | 60 |  |  | $H_2O_2$ + 0.5 g/l Sil | $H_2O_2$ + 1 g/l Sil | 210 | 134 | 3.5 | 2.2 | 20–112 | 21–114 | — | — | — | — |
|  |  | Let stand 70 min, no flow. | | | | | | | | | | | | | |
| 41 | 150 |  |  | $H_2O_2$ + 0.5 g/l Sil | $H_2O_2$ + 1 g/l Sil | 740 | 745 | 4.9 | 5.0 | 25–40 | 40–75 | 52 | 63 | — | — |

[1]Determined by dibenzoyl methane colorimetry.

Summary of Results:

The following conclusions can be drawn from the data in Table 5.

Loss of permeability is not associated with all oxidants. Note the excellent permeability with sodium chlorate, Runs 33-37B. On the other hand, the preceding examples showed that $H_2O_2$-containing leach in contact with ore caused loss of permeability. Furthermore, note from the gas collection data in Runs 33-37A that virtually all the $H_2O_2$ decomposed to $O_2$ gas during passage over the ore bed. Thus, it would appear that the loss of permeability is occasioned by $H_2O_2$ and/or the attendant oxygen resulting from decomposition of the $H_2O_2$ in contact with the ore.

Runs 33-35 clearly show that a silicate fortified peroxide leach is also freely flowing. Both the chlorate and peroxide-silicate leaches flowed freely for 270 minutes, requiring on the average a pump speed of well below 50 rpm's. It is interesting to note here that the beneficial effects from silicate were sustained for a substantial period of time after silicate was removed from the leaching solution. However, the beneficial effects gradually fell off after silicate was removed from the leaching solution. See Runs 36A-38A following Runs 33A-35A. Compare especially the 50-minute running period in Runs 38A, B.

Though (non-plugging) chlorate is also a potential oxidant for solution leaching of uranium ore, it does suffer from the disadvantage of producing far more environmentally objectionable reaction products, such as chlorite and chloride ions. Furthermore, it is a less effective oxidant for leaching uranium as shown by the data in the last column. This was so even though twice as many moles of chlorate than $H_2O_2$ were used, i.e., 0.101 vs. 0.053 moles/liter of each.

EXAMPLE IX

It was noted that when a leachate containing 10 g ABC/l+2.5 g AC/l+3 g sil/l was allowed to stand one or more days, a slight but quite noticeable haze or light cloudiness developed which indicates gelling of the silicate. This was even more noticeable by the Tyndall effect from a beam of light. After fortifying with 1.2 g $H_2O_2$/l, this aged solution was pumped through 50-100 g ore beds, which resulted in a marked loss of permeability for Ores B and C after less than 3 hours of leaching. There is no such loss when freshly made solution free of gellation is used.

EXAMPLE X

Following up on the findings of Example IX, the gellation stability of a number of leach compositions having varying salt contents was observed with respect to variations in silicate content. Hellige Turbidimeter data for the several leaches are given in Table 6 below:

TABLE 6

| | | | | Gellation Stability | |
|---|---|---|---|---|---|
| COM- | | | | A.P.H.A. TURBIDITY UNITS[2] (ppm) | |
| POSI- | LEACH | | | AFTER | |
| TION | COMPOSITION, g/l | | | 6 | 11 |
| NO.[1] | ABC | AC | SIL | pH[1] | DAYS | DAYS |
| 1 | — | 16 | 1.0 | 8.95 | 1.3 | — |
| 1A | — | 16 | 1.0 | 8.40 | — | 2.2 |
| 2 | — | 8 | 1.0 | 8.90 | nil | 0.2 |
| 2A | — | 8 | 1.0 | 8.20 | — | 0.3 |
| 3 | — | 4 | 1.0 | 8.90 | 0.1 | nil |
| 3A | — | 4 | 1.0 | 8.20 | — | nil |
| 4 | 8 | 8 | 1.0 | 8.80 | 1.3 | 1.2 |
| 4A | 8 | 8 | 1.0 | 8.20 | — | 0.95 |
| 5 | 4 | 4 | 1.0 | 8.80 | 0.70 | nil |
| 5A | 4 | 4 | 1.0 | 6.60 | — | 0.1 |
| 6 | 4 | 4 | 0.5 | 8.80 | 0.3 | nil |
| 6A | 4 | 4 | 0.5 | 7.00 | — | nil |
| 7 | 4 | 4 | 2.0 | 8.85 | 0.95 | 0.6 |
| 7A | 4 | 4 | 2.0 | 7.20 | — | 1.2 |
| 8[3] | 8 | 8 | 1.0[3] | 8.80 | 1.2 | 0.9 |
| 8A[3] | 8 | 8 | 1.0[3] | 7.20 | — | 1.2 |
| 9[3] | 4 | 4 | 1.0[3] | 8.80 | 1.2 | 1.4 |
| 9A[3] | 4 | 4 | 1.0[3] | 7.30 | — | nil |
| 10[3] | 4 | 4 | 2.0[3] | 8.80 | 1.7 | 1.4 |
| 10A[3] | 4 | 4 | 2.0[3] | 6.80 | — | 0.4 |
| 11 | 10 | 2.5 | 3.0 | 8.55 | very cloudy | gel on bottom of beaker |
| 12 | 10 | 2.5 | 3.0 | 8.55 | very cloudy | gel on bottom of beaker |

(Rows 1-10A marked CLEAR)

[1] For A series, each numbered sample was split at 6 days and the A series portion was adjusted downward with $H_2SO_4$. Thus, only the last 5 days of the 11-day readings (last column) were at the lowered pH for A series solutions.
[2] These values are from calibration curve supplied by Hellige for $SiO_2$, and do not necessarily represent the actual ppm of $SiO_2$ in these leaches.
[3] From an aged (many months old) lab supply of sodium silicate that had sediment on the bottom. All other runs used silicate from a new drum of Du Pont Grade F sodium silicate.

During this work it was observed that cloudiness (and thus, gelling) of leach solutions could be completely avoided by using 2.0 g/l or less of silicate in a solution not too concentrated in salts, e.g., 10 g/l. Within the range pH 7-8.95, it didn't seem to matter much where the pH was. At pH 10 and above, silicate is inherently free from gelling because of solubilization by base.

Overall, for the clear solutions, the only suggestion of possible or incipient gelling, as manifested by somewhat higher turbidity readings, was for compositions containing high leach salt content (Compositions Number 1, 1A, 4, 4A, 8 and 8A), high silicate (Compositions 7, 7A and 10) or aged silicate (Compositions 8-10).

Fortunately, the salt and silicate concentrations giving apparently non-gelling leaches coincide with the concentrations which are highly useful for leaching and prevention of permeability loss.

EXAMPLE XI

In this Example, extended runs were carried out which illustrate that silicate may in some instances be effective to stabilize the $H_2O_2$ solution from decomposition.

In a companion run using 100 gram charges of Ore C, a 5 cc/min flow rate, and a basic leach containing 10 g ABC/l+2.5 g AC/l+1.80 g $H_2O_2$/l (pH 8.2), the comparison tested the difference in adding or not adding 3 g $NaSiO_3$/l to the leach. The run was for 330 minutes, and permeability loss was prevented by prior screening so the ore contained −12 +80 mesh particles. The results can be summed up as follows:

| Serial Time Segments | Loss of O$_2$ in cc/min | |
| --- | --- | --- |
| | Without Silicate | With Silicate |
| First 30 min | — | — |
| 2nd 100 min | 2.4 | 1.05 |
| 3rd 100 min | 2.65 | 1.15 |
| 4th 100 min | 3.05 | 1.05 |
| TOTAL - 330 min | 2.80 | 1.26 |
| Stand overnight with no flow | — | — |
| 100 | 2.35 | 0.95 |

The O$_2$ loss for the 330 minutes corresponded to an 84% loss of H$_2$O$_2$ in the leach when the leach contained no silicate; only 37% when the leach contained silicate.

These results showed that silicate not only improved H$_2$O$_2$ stability during leaching, but also seemed to prevent an increase in instability with time.

We claim:

1. In a process for the solution mining of a uranium ore formation where an aqueous carbonate leaching solution containing an oxidant is passed through the ore formation to dissolve uranium from the formation therein and the solution is withdrawn from the ore formation enriched in uranium, the improvement comprising preventing permeability loss by passing through the ore formation, which otherwise would thereby have a permeability loss, aqueous ammonium carbonate leaching solution having a pH of 7–10, and which has dissolved therein an oxidant selected from the group consisting of hydrogen peroxide, molecular oxygen and a mixture thereof and a small amount of alkali metal silicate effective to restore the permeability.

2. The process of claim 1 wherein the leaching solution contains 0.1–5 grams per liter of alkali metal silicate.

3. The process of claim 2 wherein the leaching solution contains 0.1–10 grams per liter of H$_2$O$_2$ and 0.5–20 grams per liter of ammonium carbonates.

4. The process of claim 3 wherein the alkali metal silicate is sodium silicate present in the solution at a concentration of 0.5–1.5 grams per liter.

5. The process of claim 3 wherein the silicate-containing leaching solution is passed through the ore formation after a nonsilicate-contaning leaching solution has been passed through the ore formation resulting in reduced permeability of the ore formation.

* * * * *